United States Patent
Lee (10) Patent No.: US 11,260,525 B2
(45) Date of Patent: Mar. 1, 2022

(54) MASTER ROBOT FOR CONTROLLING SLAVE ROBOT AND DRIVING METHOD THEREOF

(71) Applicant: LG ELECTRONICS INC., Seoul (KR)

(72) Inventor: Won Hee Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 240 days.

(21) Appl. No.: 16/574,786

(22) Filed: Sep. 18, 2019

(65) Prior Publication Data

US 2020/0023511 A1 Jan. 23, 2020

Related U.S. Application Data

(63) Continuation of application No. PCT/KR2019/006529, filed on May 30, 2019.

(51) Int. Cl.
*B25J 3/00* (2006.01)
*B25J 9/16* (2006.01)
*B25J 9/00* (2006.01)

(52) U.S. Cl.
CPC ............. *B25J 3/00* (2013.01); *B25J 9/0084* (2013.01); *B25J 9/1666* (2013.01); *B25J 9/1697* (2013.01)

(58) Field of Classification Search
CPC . B25J 3/00; B25J 9/1666; B25J 9/1697; B25J 9/0084; B25J 9/1602; G05B 2219/2231; G05D 1/0246; G05D 1/0274; G05D 1/0295

USPC ......... 700/245, 248; 701/23, 27, 409; 901/1, 901/46
See application file for complete search history.

(56) References Cited

U.S. PATENT DOCUMENTS

| | | | |
|---|---|---|---|
| 2002/0095239 A1 | 7/2002 | Wallach et al. | |
| 2014/0035725 A1* | 2/2014 | Bruemmer | G05D 1/0274 340/8.1 |
| 2018/0039258 A1* | 2/2018 | Zou | B65G 43/08 |
| 2018/0211103 A1* | 7/2018 | Sohn | B25J 9/1666 |
| 2019/0248007 A1* | 8/2019 | Duffy | B25J 9/08 |

FOREIGN PATENT DOCUMENTS

| KR | 10-2010-0031878 | 3/2010 |
|---|---|---|
| KR | 10-2011-0124587 | 11/2011 |
| KR | 10-2013-0051679 | 5/2013 |
| KR | 10-2016-0038437 | 4/2016 |
| KR | 10-2017-0048815 | 5/2017 |
| KR | 10-2018-0048705 | 5/2018 |

* cited by examiner

*Primary Examiner* — Dalena Tran
(74) *Attorney, Agent, or Firm* — KED & Associates LLP (57) ABSTRACT

Disclosed is a master robot for controlling at least one slave robot. The master robot includes a communicator that communicates with the slave robot or a mobile terminal, at least one sensor, an inputter that inputs an image signal or an audio signal, and a controller that creates a space map corresponding to a predetermined space in which the master robot and the slave robot are located on the basis of information sensed by the sensor or information inputted through the inputter. Accordingly, a master robot equipped with artificial intelligence and a 5G communication module can be provided.

16 Claims, 7 Drawing Sheets

MASTER ROBOT FOR CONTROLLING SLAVE ROBOT AND DRIVING METHOD THEREOF

CROSS-REFERENCE TO RELATED APPLICATION

This present application is a continuation application of PCT Patent Application No. PCT/KR2019/006529, entitled "Master robot for controlling slave robot and driving method thereof," filed on May 30, 2019, in the World Intellectual Property Organization, the entire disclosure of which is incorporated herein by reference.

BACKGROUND

1. Field of the Invention

The present invention relates to a master robot for controlling a slave robot in a robot control system and a driving method thereof.

2. Description of Related Art

Robots have been developed for industrial use and have been used as a part of factory automation. Recently, the fields, in which robots are applied, have been further expanded, so that medical robots. Aerospace robots, and the like are being developed, and household robots that can be used in ordinary homes are also being produced.

Related art 1 (KR101629649B) discloses a robot for sensing a human motion and a cooperative robot system for performing operations by forming a network between robots.

However, although the related art 1 discloses a plurality of robots for achieving a specific purpose, there is a problem in that one robot does not become a master for a specific purpose and cannot efficiently control slave robots.

A mobile robot in related art 2 (KR101503903B) attempts to configure an obstacle map and a map of feature points for an unknown environment by controlling a path.

However, although the mobile robot in the related art 2 creates its own path along which the mobile robot can move, there is a problem in that one robot does not become a master for a specific purpose and cannot efficiently control slave robots and cannot create a path of another robot.

SUMMARY OF THE INVENTION

An object of the present invention is to provide a master robot whose efficiency of robot control is improved by controlling a plurality of robots by one robot.

Another object of the present invention is to provide a master robot for determining a movement path of a slave robot so that the slave robot avoids an obstacle.

Another object of the present invention is to provide a master robot which can create a space map corresponding to a space in which a master robot and a slave robot are located, thereby allowing the slave robot to move quickly.

The technical objects of the present invention are not limited to the above technical objects, and other technical objects that are not mentioned will be apparent to those skilled in the art from the following description.

In order to achieve the above object, a master robot according to an embodiment of the present invention includes a communication unit that communicates with a slave robot or a mobile terminal, at least one sensing unit, an input unit for inputting an image signal or an audio signal, and a control module that creates a space map corresponding to a predetermined space in which the master robot and the slave robot are located on the basis of information sensed by the sensing unit or information inputted through the input unit.

Specifically, when receiving, through the input unit or the mobile terminal, a move command for moving the slave robot in the predetermined space, the control module may move the slave robot on the basis of the space map.

In order to achieve the above object, when an obstacle is detected on a path along which the slave robot is to move, a master robot according to an embodiment of the present invention may control the slave robot so that the slave robot avoids the obstacle.

According to various embodiments of the present invention, the following effects can be derived.

First, the efficiency of robot control can be improved by controlling a plurality of robots by one robot.

Secondly, by providing a master robot for monitoring the movement of a slave robot, the slave robot can avoid obstacles and reach a destination effectively.

Third, when setting the movement path of a slave robot, a space map corresponding to a space is created, and thus the slave robot can quickly and safely reach the destination.

DETAILED DESCRIPTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
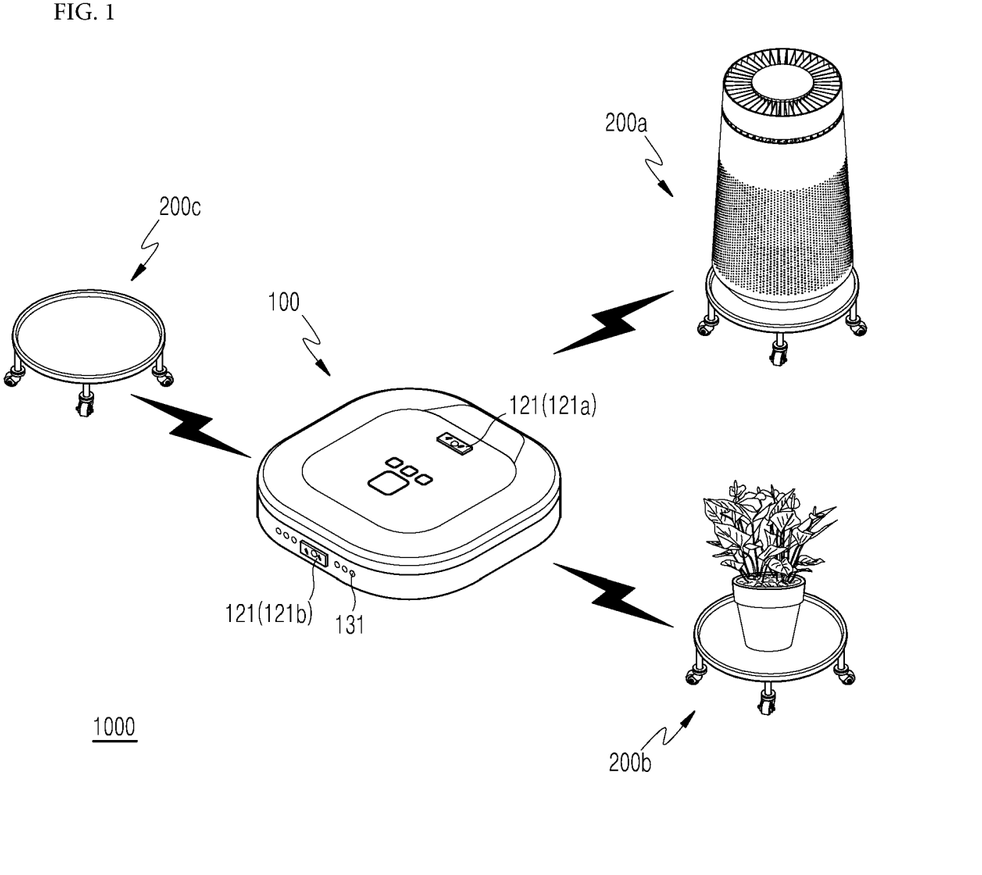
FIG. 1 is a view for explaining a master robot for controlling one or more slave robots in a robot control system according to an embodiment of the present invention.

FIG. 1 is a view for explaining a master robot 100 for controlling one or more slave robots 200a to 200c in a robot control system 1000 according to an embodiment of the present invention. The robot control system 1000 is a system for controlling one or more robots, and the robot control system 1000 may include a greater number of master robots than the master robot 100 illustrated in FIG. 1 and include more or fewer slave robots than the illustrated slave robots 200a to 200c.

The master robot 100 may control the slave robots 200a to 200c in a predetermined space. The predetermined space may include an indoor space such as a home, a company, a hospital, or an outdoor specific space.

For example, the master robot 100 may be a robot cleaner. The robot cleaner 100 may include an upper camera 121a and a front camera 121b, and display a space on a space map on the basis of an image. The master robot 100 may realize a space map by recognizing a shape of a ceiling, shapes of walls/columns, doors, and the like using the cameras 121a and 121b. In addition, the robot cleaner 100 may include various sensors (e.g., an obstacle sensor 131) to detect a collision during movement.

The slave robots 200a to 200c may carry an electronic device that performs a specific function, and for example, the first slave robot 200a may carry an air purifier, the second slave robot 200b may carry a pot, and the third slave robot 200c may wait to carry a specific device.

According to another embodiment, the slave robot may be configured in a combination form in which a mobile module and a module for performing a specific function (e.g., an air cleaning module, a humidification module, a speaker module, a fan module, a heater module, etc.) are combined. The module for performing the specific function may be configured in a form to be attachable to or detachable from the mobile module.

The slave robots 200a to 200c include only a moving means (e.g., a wheel) and a communication unit, and may perform a specific operation (e.g., moving) under the control of the master robot 100.

Figure 2:
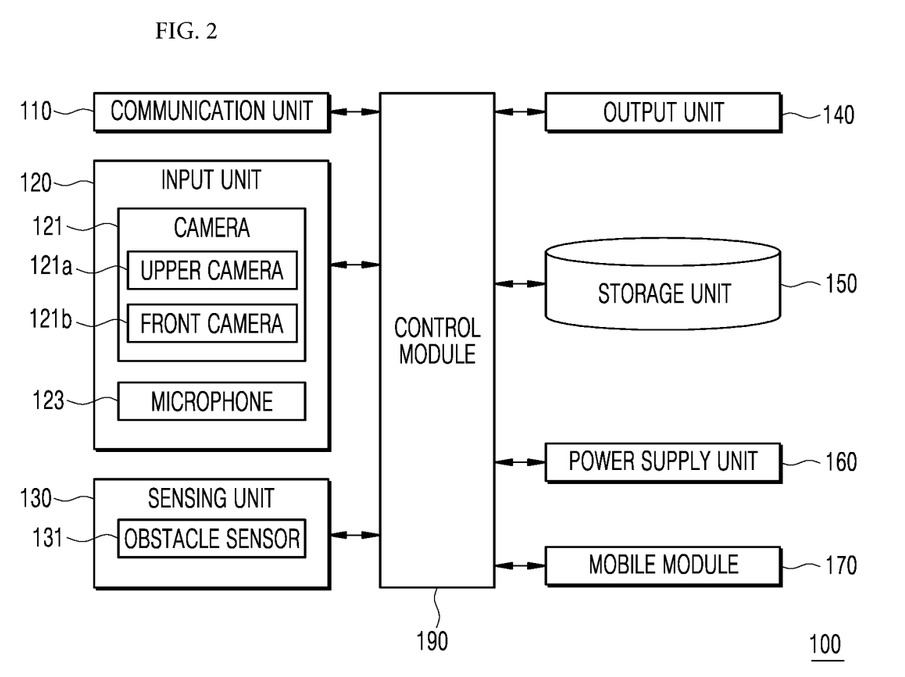
FIG. 2 is a block diagram illustrating the configuration of a master robot according to an embodiment of the present invention.

Hereinafter, the configuration of the master robot 100 will be described with reference to FIG. 2. The master robot 100 may include a communication unit 110, an input unit 120, a sensing unit 130, an output unit 140, a storage unit 150, a power supply unit 160, a mobile module 170, and a control module 190. The components shown in FIG. 2 are not essential for embodying the master robot 100, and thus the master robot 100 described herein may have more or fewer components than those listed above.

More specifically, the communication unit 110 among the components may include one or more wired or wireless communication modules that enable communication between the master robot 100 and the slave robot (e.g., 200 in FIG. 3), between the master robot 100 and the mobile terminal (e.g., 300 in FIG. 6), and between the master robot 100 and a device equipped with a communication module. In some implementations, communication unit 110 may be implemented a communicator. In some implementations, the communication unit 110 comprises at least one of a communicator or consists of at least one of a communicator.

First, the communication unit 110 may include a mobile communication module. Here, the mobile communication module may transmit/receive a wireless signal to/from at least one among a base station, an external terminal, and a server via a mobile communication network established according to the technical standards or communication methods for mobile communication (e.g., Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A)) and 5 Generation (G) communication.

In addition, the communication unit 110 may include a short range communication module. Here, the short range communication module is for short range communication and may perform short range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (Wireless USB) technologies.

The input unit 120 may include a camera 121 or an image input unit, which is for image signal input, a microphone 123 or an audio input unit, which is for audio signal input, a user input unit 123 (e.g., a touch key and a push key (mechanical key), and etc.), which is for receiving information from a user, and the camera 121 may include the upper camera 121a and the front camera 121b shown in FIG. 1. In some implementations, the input unit 120 may be implemented inputter or input interface. In some implementations, the input unit 120 comprises at least one of inputter or consists of at least one of inputter. In some implementations, the input unit 120 may be configured to input data and signals.

The upper camera 121a is a camera that captures an image in an upper direction and may be mainly used to create a map for the space. The front camera 121b may be mainly used for monitoring the slave robot 200, but embodiments are not limited thereto.

The sensing unit 130 may include at least one sensor for sensing at least one of information in the master robot 100, environmental information around the master robot 100, and user information. For example, the sensing unit 130 may include at least one of an obstacle sensor 131 (e.g., proximity sensor), a Lidar sensor, a weight detection sensor, an illumination sensor, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (see camera 121), a microphone (see microphone 123), a battery gauge, an environmental sensor (e.g., barometer, hygrometer, thermometer, radiation detection sensor, heat detection sensor, gas detection sensor, etc.), and a chemical sensor (e.g., electronic nose, healthcare sensor, biometric sensor, etc.). Moreover, the master robot 100 disclosed herein may use combined information sensed by at least two or more sensors of these sensors.

The output unit 140 is for generating an output related to a visual, auditory or tactile sense, and may include at least one of one or more displays, one or more light emitting elements, an acoustic output unit, and a haptic module. The display may have a layered structure with a touch sensor or is integrally formed with the touch sensor, thereby being configured in the form of a touch screen. Such a touch screen may function as a user input unit for providing an input interface between the master robot 100 and a user and also provide an output interface between the master robot 100 and a user.

The storage unit 150 stores data that supports various functions of the master robot 100. The storage unit 150 may store a plurality of application programs (e.g., application programs or applications) running on the master robot 100, and also store data and commands for operations of the master robot 100. At least part of such application programs may be downloaded from an external server through a wireless communication. In addition, the storage unit 150 may store information of a user who tries to perform an interaction with the master robot 100. The user information may be used to identify who the recognized user is.

The power supply unit 160 receives external power and internal power under the control of the control module 190 and supplies power to each component of the master robot 100. The power supply unit 160 includes a battery, and the battery may be a built-in battery or a replaceable battery. The battery may be charged through a wired or wireless charging scheme and the wireless charging scheme may include a magnetic induction scheme or a self-resonance scheme.

The mobile module 170 is a module for moving to a predetermined place under the control of the control module 190, and may be configured to include one or more wheels. The mobile module comprises at least one of a mover or consists of at least one of a mover. The mover is configured to move to a predetermined place under the control of the control module 190.

The control module 190 may create a space map corresponding to a predetermined space in which the master robot 100 and the slave robot 200 (for example, 200 in FIG. 3) are arranged. The control module 190 may stereoscopically store an area where the master robot 100 and the slave robot 200 are arranged, by using the upper camera 121a and the front camera 121b, and may specify and store the location information about the master robot 100 and the slave robot 200 on the space map. The space map may be created by the control module 190 itself, but may be created or supplemented by an external server calculation. In some implementations, the control module 190 may be implemented a controller. In some implementations, the control module 190 comprises at least one of a controller or consists of at least one of a controller.

The control module 190 may receive identification information or shape information on the slave robot 200 from the slave robot 200 through the communication unit 110 and apply the information onto the space map.

Here, the identification information of the slave robot 200 includes information with which the slave robot 200 is uniquely identifiable, and the shape information may include information that indicates the appearance of the slave robot 200. When the identification information and the shape information are applied onto the space map, the identification effect and the recognition effect may be visually achieved.

When moving the slave robot 200 in a predetermined space, the control module 190 may move the slave robot 200 on the basis of the position information on the slave robots 200 in the space map and the image information collected from the camera 121, etc. The master robot 100 may receive a move command for moving the slave robot 200 by a user voice, a touch input of the mobile terminal 300 (see FIG. 6), and the like, but the move command is not limited to the above example.

When moving the slave robot 200 on the basis of the space map, the control module 190 may control the input unit 120 or the sensing unit 130 to monitor movement of the slave robot 200. Accordingly, it is possible to intuitively recognize the slave robot 200 by the master robot 100.

If the slave robot 200 is out of the image-capturing range of the input unit 120, the control module 190 controls the mobile module 170 to allow the slave robot 200 to enter the image-capturing range of the input unit 120 so that the mobile module 170 may approach the slave robot 200.

In addition, the control module 190 may control the mobile module 170 to move together with the slave robot 200 to the input destination. For example, the control module 190 may control the master robot 100 and the slave robot 200 so that the master robot 100 moves together with the slave robot 200 while keeping a predetermined distance from the slave robot 200.

In addition, when the control module 190 receives the move command of the slave robot 200, the shortest distance path, the shortest time path, and the like among the various moving paths toward the destination may be customized and provided to the slave robot 200.

In addition, the control module 190 may control the slave robots such that the distance between the slave robots does not fall within a predetermined range on the basis of the image signal inputted in real time through the input unit 120. That is, the master robot 100 may control the slave robots to prevent collision between the slave robots.

Figure 3:
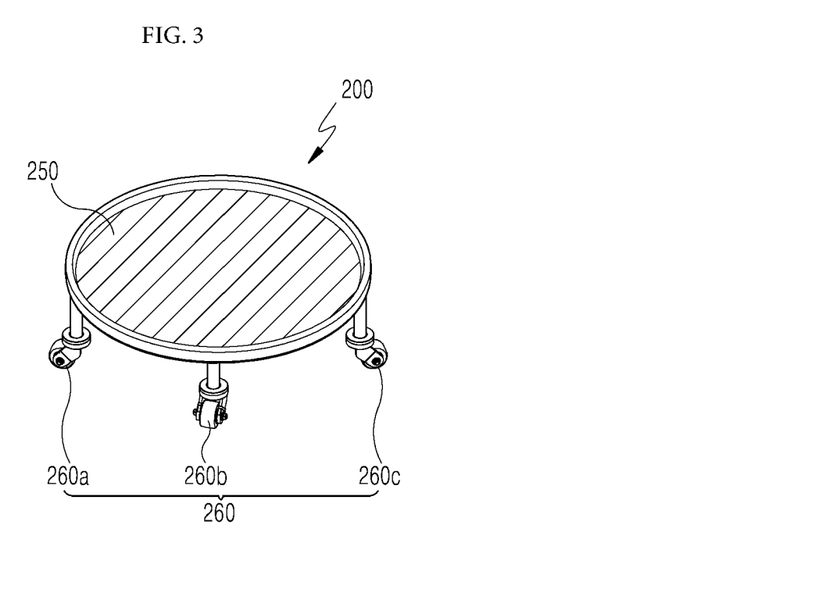
FIG. 3 is a view for explaining a slave robot according to an embodiment of the present invention.

Hereinafter, the slave robot 200 communicating with the master robot 100 will be described with reference to FIG. 3.

The slave robot 200 may include a device support unit 250 for supporting an electronic device and a mobile module 260 (260a to 260c) including a plurality of wheels 260a to 260c. The slave robot 200 may include a communication unit to communicate with the master robot 100 and may also perform mobile communication or short range communication with an external device. According to another embodiment, the slave robot 200 may be configured such that an electronic device for performing a specific function is built therein or a module for performing a specific function is detachably provided.

The slave robot 200 may provide the master robot 100 with the external shape information, control method information, and etc. on the slave robot 200, and the master robot 100 may easily recognize or control the slave robot 100 on the basis of the provided information. The master robot 100 may more clearly recognize the slave robot 200 through the input unit 120 on the basis of the external shape information. Then, the master robot 100 may apply the recognized slave robot 200 onto the space map, and store the applied space map in the storage unit 150.

Here, the slave robot 200 may be configured to include more complicated functions (sensing function, photographing function, etc.) but in order to reduce the cost of the robot control system 1000 and efficiently utilize various robots, the above function may be applied only to the master robot.

Figure 4:
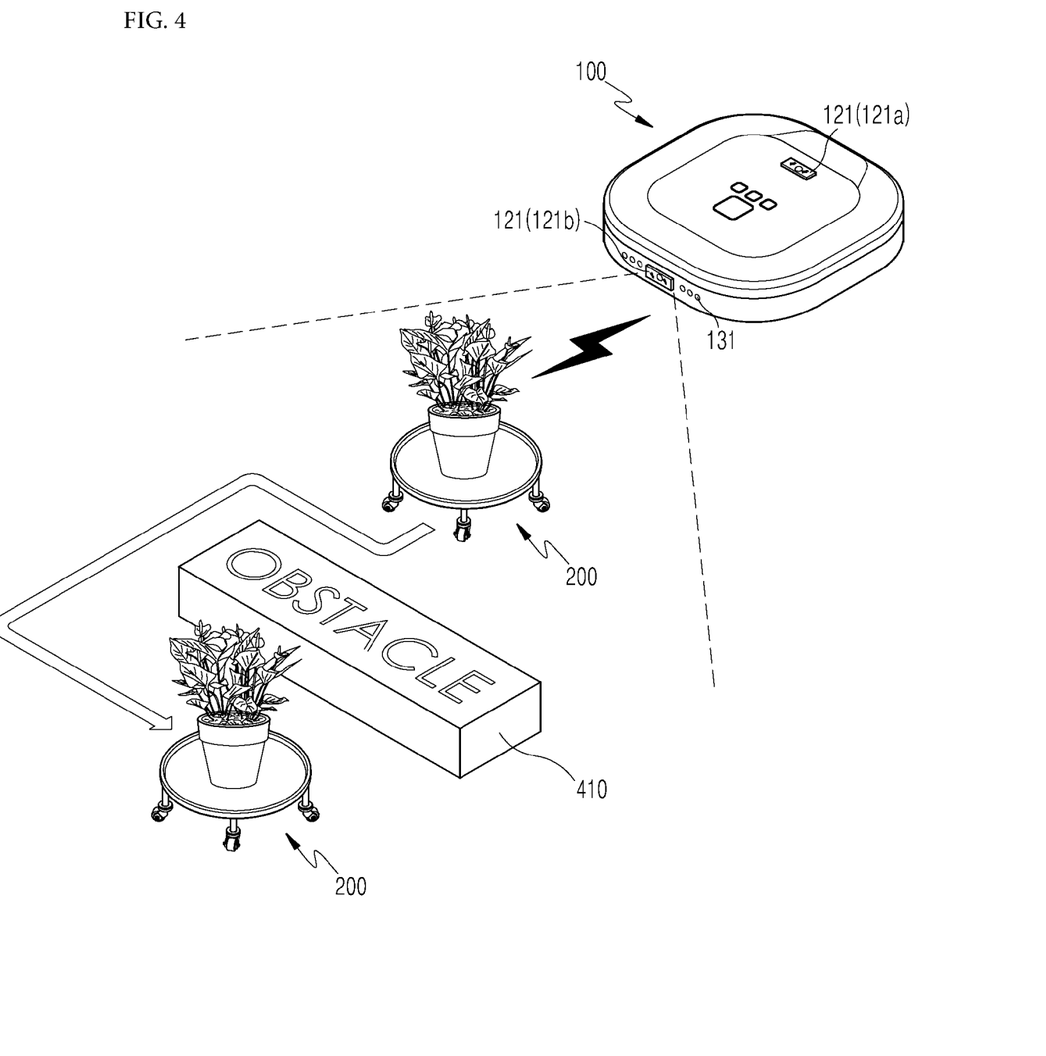
FIGS. 4 and 5 are views for explaining a master robot for controlling a slave robot according to an embodiment of the present invention.
Figure 5:
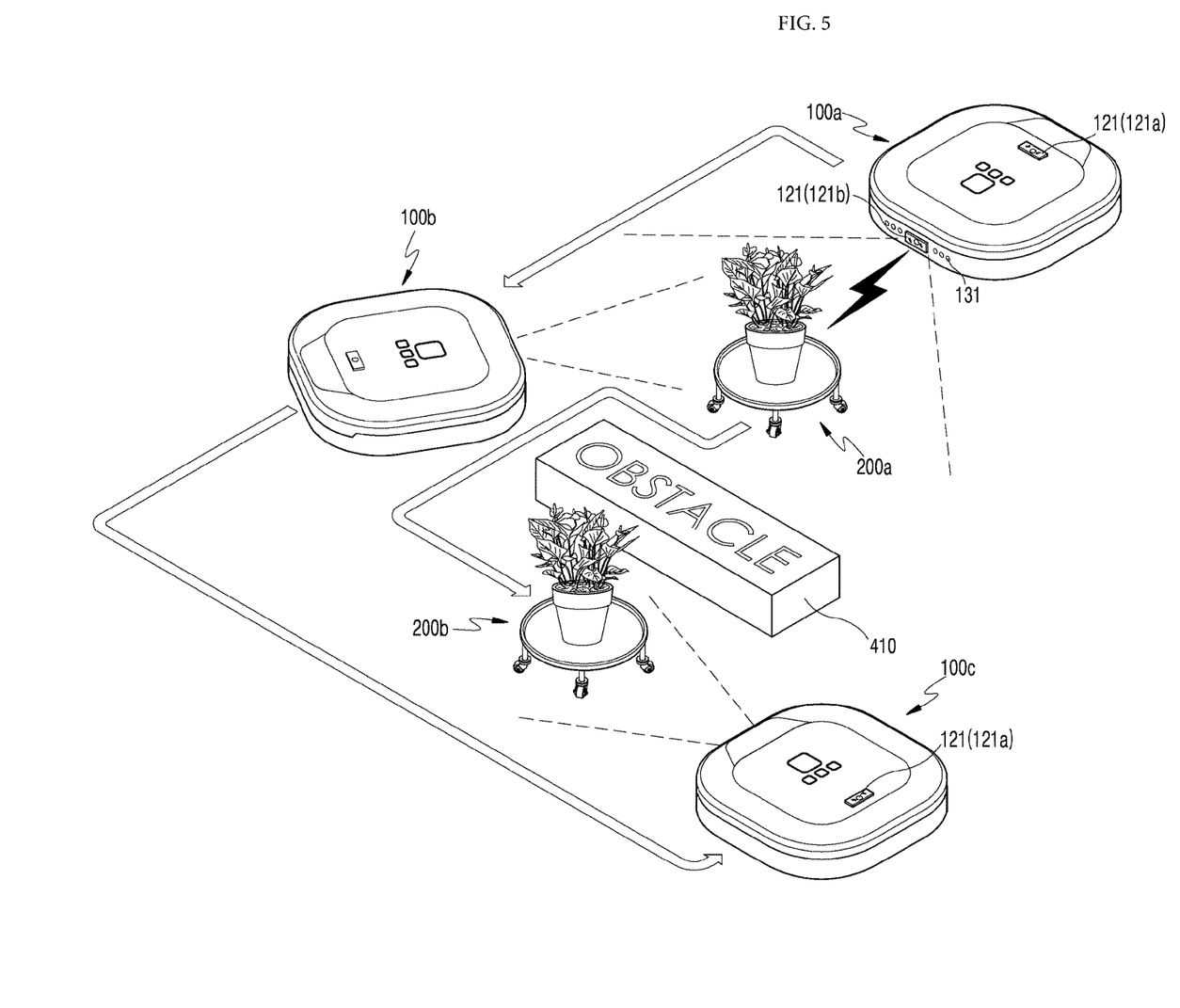

FIGS. 4 and 5 are views for explaining a master robot 100 for controlling a slave robot 200 according to an embodiment of the present invention.

Referring to FIG. 4, when receiving movement destination information on a specific slave robot 200, the master robot 100 may search a plurality of paths and determine, from among the paths, an optimal path to avoid an obstacle 410. At this time, when specifying the slave robot 200, the master robot 100 may receive external shape information, control method information and etc. on the slave robot 200 through communication with the slave robot 200 and specify the slave robot 200.

The master robot 100 may control the slave robot 200 in real time so that the slave robot 200 avoids the obstacle 410, and the slave robot 200 may move while avoiding the obstacle 410 under the control of the master robot 100.

Specifically, the master robot 100 may include a front camera 121*b* to monitor the moving direction of the slave robot 200, and control the slave robot 200 so that the slave robot 200 avoids the static or dynamic obstacle 410 by using the created space map.

In addition, the master robot 100 may move to a destination together with the slave robot 200. According to one embodiment, when an electronic device mounted on the slave robot 200 is not operated in a wireless manner but operated in a wired manner, the master robot 100 may move the slave robot 200 while supplying power to the slave robot 200.

Referring to FIG. 5, the master robot 100 may monitor the moving direction of the slave robot 200 using the front camera 121*b*. The master robot 100 may control the slave robot 200 so as to avoid the obstacle 410 before the slave robot 200 collides with the obstacle 410. According to another embodiment, the master robot 100 may transmit a move wait command to the slave robot 200 when the slave robot 200 is adjacent to the obstacle 410 with a predetermined distance.

When the slave robot 200 is adjacent to the obstacle with a predetermined distance, the master robot 100 may move in the front direction 100*b* of the slave robot 200*a*. The master robot 100 may avoid the obstacle 410 together with the slave robots 200*a* to 200*b* while guiding (100*a* to 100*c*) the moving direction of the slave robot 200*a* on the basis of the positions of the slave robot 200*a* and the obstacle 410.

Figure 6:
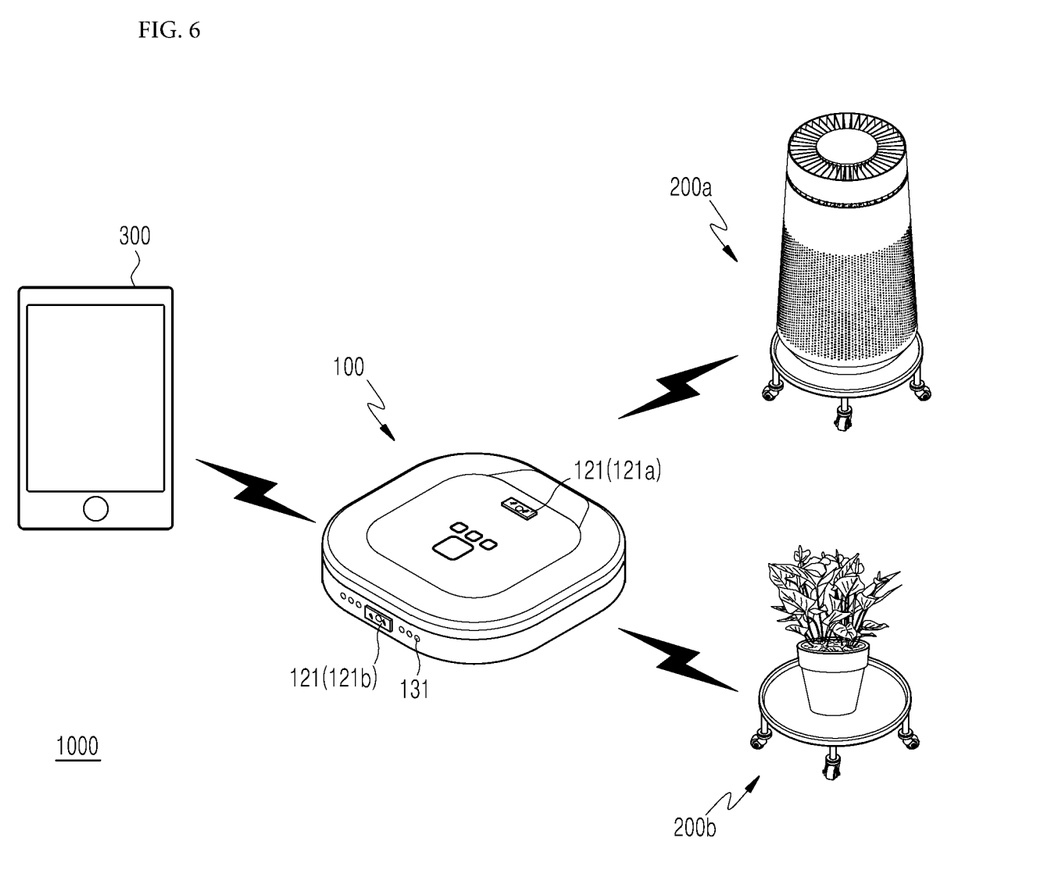
FIG. 6 is a view for explaining a master robot communicating with a mobile terminal according to an embodiment of the present invention.
Figure 7:
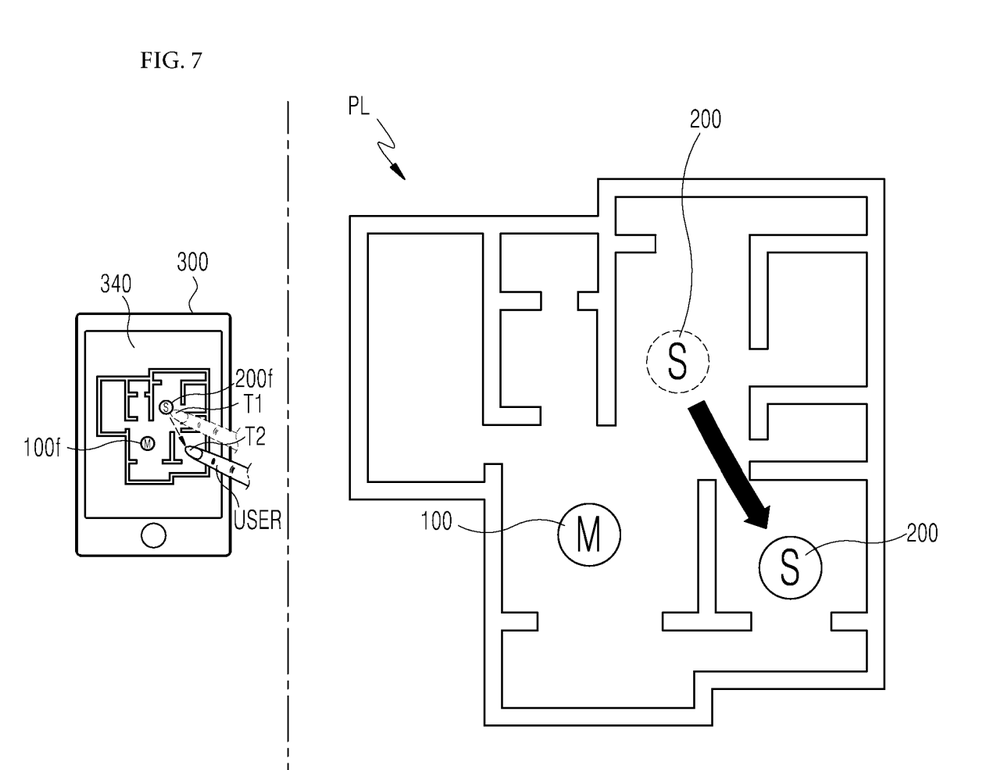
FIG. 7 is a view for explaining a master robot for controlling a slave robot when there is a request from a mobile terminal, according to an embodiment of the present invention.

FIG. 6 is a view for explaining a master robot 100 that communicates with a mobile terminal 300 according to an embodiment of the present invention, and FIG. 7 is a view for explaining a master robot 100 that controls a slave robot 200 when there is a request from a mobile terminal 300 according to an embodiment of the present invention.

The master robot 100 may communicate with the mobile terminal 300 and the slave robots 200*a* and 200*b*. The mobile terminal 300 may control the slave robots 200*a* and 200*b* through simple button input, and according to another embodiment, may control each of the slave robots 200*a* and 200*b* through the master robot 100 by using an application that is operated by software.

Here, the master robot 100 may include a 5G communication module. The master robot 100 may transmit data at a speed of 100 Mbps to 20 Gbps to transmit a large amount of videos to the mobile terminal 300, and may be driven with low power to minimize power consumption.

Accordingly, even if being far away from the point where the master robot 100 is disposed, the mobile terminal 300 may quickly receive, from the master robot 100, space map information, information on captured image, and the like.

In addition, the master robot 100 may support various kinds of intelligent communication of Things (Internet of Things (IoT), Internet of Everything (IoE), Internet of Small Things (IoST), and the like), and the master robot 100 may support Machine to Machine (M2M) communication, Vehicle to Everything Communication (V2X) communication, Device to Device (D2D) communication, and the like.

Referring to FIG. 7, the master robot 100 may provide the mobile terminal 300 with the space map information on a predetermined area where the master robot 100 is located, and the mobile terminal 300 may request the master robot 100 to move the slave robot 200*f* from the first position T1 to the second position T2. The request may be performed with a touch drag input, but the embodiment is not limited thereto.

When a move command for moving the slave robot 200*f* to a predetermined spot T2 on the space map displayed on the mobile terminal 300 is received through the communication unit 110, the master robot 100 may move the slave robot 200 to a position corresponding to the spot T2 in the predetermined space PL.

The master robot 100 and the mobile terminal 300 include the 5G communication module so that the control command inputted from the mobile terminal 300 may quickly reach the master robot 100 disposed in the predetermined space PL. Accordingly, the master robot 100 may control the slave robot 200 to move the slave robot 200 in real time upon receiving the move command from the mobile terminal 300.

Figure 8:
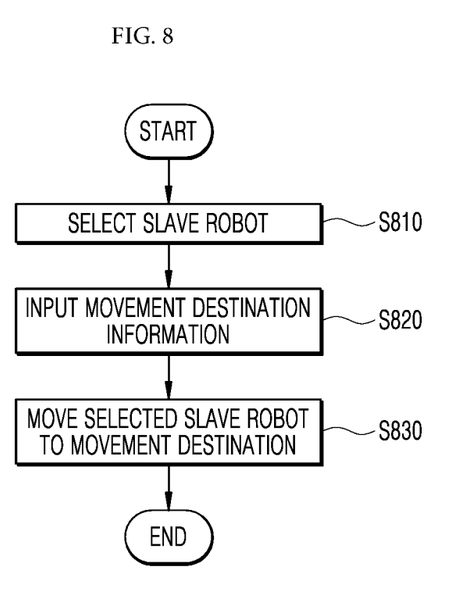
FIG. 8 is a sequence diagram illustrating the driving of a master robot according to an embodiment of the present invention.

FIG. 8 is a sequence diagram for explaining driving and controlling of a master robot 100 according to an embodiment of the present invention.

First, the master robot 100 selects a slave robot, that is, a control target (S810).

Here, the master robot 100 may include a mobile module capable of moving the master robot 100, and the slave robot may perform specific functions even if the slave robot is able or unable to move.

The master robot 100 may create a space map corresponding to a predetermined space in which the master robot 100 and the slave robot 200 are located. Thereafter, the master robot 100 may select a robot to be controlled from among the slave robots. The selection may be performed by user input, and according to another embodiment, the slave robot may be selected on the basis of self-determination. Here, the user input may include a user voice input, a user touch input, and the like.

When creating a space map, the master robot 100 may apply the position information on the master robot 100 and the slave robot 200 onto the space map. The master robot 100 may receive identification information or shape information on the slave robot 200 from the slave robot 200 and apply the received identification information or shape information onto the space map.

Here, the master robot 100 may transmit information on the created space map to the external mobile terminal 300.

Then, the master robot 100 receives an input of the movement destination (S820).

The movement destination information may be performed by user input, but may be performed on the basis of the self-determination of the master robot 100 according to an embodiment.

The master robot 100 may receive, from the mobile terminal 300, a move command for moving the selected slave robot 200 to the movement destination on the space map displayed on the mobile terminal 300.

Then, the master robot 100 moves the selected slave robot to the movement destination (S830).

The master robot 100 may wirelessly control the slave robot 200 according to wireless communication. Specifically, the master robot 100, while being immobilized, may move only the slave robot 200, and may move to the destination along with the slave robot 200 at a predetermined distance. According to another embodiment, the master robot 100, while moving ahead of the slave robot 200, may monitor whether the slave robot 200 follows.

The master robot 100 may prevent the slave robots from colliding with each other by adjusting the distance between the slave robots on the basis of the image signal inputted in real time. Also, when the distance from the following slave robot 200 is a predetermined distance or more, the master robot 100 may control the moving speed of the slave robot 200 to be higher.

Also, if an obstacle is detected on the path along which the slave robot 200 is to move, the master robot 100 may control the slave robot 200 so that the slave robot 200 moves while avoiding the obstacle.

Meanwhile, the control module 190 of the master robot 100 may further include an artificial intelligence module. The artificial intelligence module may create a space map on the basis of the image captured by the camera 121 and recognize the master robot 100, the slave robot 200, the user in the space and etc., and store and display the recognized results on the space map. The artificial intelligence module may control the slave robot 200 so that the slave robot 200 may avoid obstacles.

The artificial intelligence module may perform calculation based on a machine learning or deep learning network, and perform a context awareness function. Also, the control module 190 may recognize the situation of a robot by using sensed values, user's control, information received from other robots or servers, and the like as input values of the artificial intelligence module. In addition, the control module 190 may perform image processing for reading an image captured by the camera 121 using an artificial intelligence module.

The above-described artificial intelligence module may include an inference engine, a neural network model, a probability model, and the like. The artificial intelligence module may perform supervised learning or unsupervised learning on the basis of various data.

In addition, the artificial intelligence module may perform natural language processing to recognize the user's voice and extract information therefrom.

The above-described present invention may also be implemented with computer-readable codes in a computer-readable recording medium. The computer-readable recording medium is any data storage device that may store data which may thereafter be read by a computer system. Examples of the computer-readable recording medium include a Hard Disk Drive (HDD), a Solid State Disk (SSD), a Silicon Disk Drive (SDD), a ROM, a RAM, a CD-ROM, a magnetic tape, a floppy disk, an optical data storage device and etc., and in addition, the computer may be implemented to include the control module 190 of the master robot 100.

In the above, although specific embodiments of the present invention have been illustrated and described, the present invention is not limited to the embodiments described, and it will be understood by those skilled in the art that various changes and modifications may be made to be other specific embodiments without departing from the spirit and scope of the invention. Therefore, the scope of the present invention is not to be determined by the described embodiments but should be determined by the technical idea described in the claims.

What is claimed is:

1. A master robot for controlling at least one slave robot, the master robot comprising:
   a communicator for communicating with the slave robot or a mobile terminal;
   at least one sensor;
   an inputter for inputting image signals by an upper camera and a front camera or an audio signal; and
   a controller for creating a space map corresponding to a predetermined space in which the master robot and the slave robot are located, on the basis of information sensed by the sensor or information inputted through the inputter,
   wherein when receiving, through the inputter or the mobile terminal, a move command for moving the slave robot, the controller moves the slave robot on the basis of the space map,
   wherein the controller is configured to receive shape information of the slave robot through the communicator, wherein the shape information indicates appearance of the slave robot, and the controller is configured to apply the received shape information to the space map,
   wherein the controller is configured to receive movement destination information of a selected slave robot, and is configured to move the selected slave robot to a movement destination based on the space map, and
   wherein the controller is configured to determine a path customized to the selected slave robot among various moving paths toward the destination.

2. The master robot of claim 1, wherein when moving the slave robot, the controller controls the inputter or the sensor to monitor movement of the slave robot.

3. The master robot of claim 1, wherein the controller applies position information about the master robot and the slave robot to the space map.

4. The master robot of claim 3, wherein the controller receives identification information of the slave robot through the communicator, and applies the received identification information to the space map.

5. The master robot of claim 3, wherein the controller controls the slave robot so that a distance between the slave robots does not fall within a predetermined range on the basis of an image signal inputted in real time through the inputter.

6. A master robot for controlling at least one slave robot using artificial intelligence, the master robot comprising:
   a communicator for communicating with the slave robot or a mobile terminal;
   a mover;
   at least one sensor;
   an inputter for inputting image signals by an upper camera and a front camera or an audio signal; and
   a controller for creating a space map corresponding to a predetermined space in which the master robot and the slave robot are located, on the basis of information sensed by the sensor or information inputted through the inputter,
   wherein when receiving a move command for moving the slave robot through the inputter or the mobile terminal, the controller moves the slave robot on the basis of the space map, and when the slave robot deviates outside an image-capturing range of the inputter, the controller controls the mover to capture the slave robot within the image-capturing range of the inputter, wherein the controller is configured to receive shape information of the slave robot through the communicator, wherein the shape information indicates appearance of the slave robot, and the controller is configured to apply the received shape information to the space map, wherein the controller is configured to receive movement destination information of a selected slave robot, and is configured to move the selected slave robot to a movement destination on the basis of the space map, wherein the controller is configured to determine a path customized to the selected slave robot among various moving paths toward the destination.

7. The master robot of claim 6, wherein, if an obstacle is detected on a path along which the slave robot is to move, the controller controls the slave robot to move while avoiding the obstacle.

8. The master robot of claim 7, wherein if an obstacle is detected on a path along which the slave robot moves, the controller moves in a front direction of the slave robot and controls the mover and the slave robot to avoid the obstacle together with the slave robot.

9. The master robot of claim 6, wherein the controller transmits information on the space map to the mobile terminal through the communicator, and when a move command for moving the slave robot to a predetermined spot on a space map displayed on the mobile terminal is received through the communicator, the controller moves the slave robot to the predetermined spot.

10. A method of a master robot which controls at least one slave robot, the master robot including a controller, a communicator, a sensor, and an inputter, the method comprising:

creating, by the controller, a space map corresponding to a predetermined space in which the master robot and the slave robot are located, based on information sensed by the sensor or information inputted through the inputter;

receiving movement destination information of a selected slave robot;

moving the selected slave robot to a movement destination based on the space map;

receiving, through the communicator, shape information of the slave robot, wherein the shape information indicates appearance of the slave robot;

applying the received shape information to the space map;

receiving movement destination information of a selected slave robot and moving the selected slave robot to a movement destination based on the space map; and determining a path customized to the selected slave robot among various moving paths toward the destination.

11. The method of claim 10, wherein the creating of the space map comprises applying position information of the master robot and the slave robot to the space map.

12. The method of claim 11, wherein the creating of the space map comprises:

receiving identification information of the slave robot from the slave robot; and applying the received identification information of the slave robot to the space map.

13. The method of claim 10, further comprising controlling the slave robot so that a distance between the slave robots does not fall within a predetermined range on the basis of an image signal inputted in real time.

14. The method of claim 10, wherein the moving of the selected slave robot to the movement destination comprises controlling the slave robot so that the slave robot moves while avoiding an obstacle when the obstacle is detected on a path along which the slave robot is to move.

15. The method of claim 10, wherein the moving of the selected slave robot to the movement destination comprises moving in a front direction of the slave robot and moving the master robot and the slave robot to avoid an obstacle together with the slave robot when the obstacle is detected on a path along which the slave robot is to move.

16. The method of claim 10, further comprising transmitting information of the created space map to a mobile terminal, wherein the receiving of the movement destination information comprises receiving a move command for moving the selected slave robot to a movement destination on the space map displayed on the mobile terminal.

* * * * *